United States Patent [19]

Mueller

[11] Patent Number: 4,714,129
[45] Date of Patent: Dec. 22, 1987

[54] TRANSMISSION SYSTEM WITH INTERMEDIATE DIFFERENTIAL FOR ALL-WHEEL DRIVE VEHICLE

[75] Inventor: Robert Mueller, Moensheim, Fed. Rep. of Germany

[73] Assignee: Dr. Ing. h.c.F. Porsche Aktiengesellschaft, Weissach, Fed. Rep. of Germany

[21] Appl. No.: 835,647

[22] Filed: Mar. 3, 1986

[30] Foreign Application Priority Data

Mar. 2, 1985 [DE] Fed. Rep. of Germany ....... 3507492

[51] Int. Cl.⁴ .................... B60K 17/346; B60K 17/348
[52] U.S. Cl. ........................................ 180/248; 74/711; 180/247
[58] Field of Search ............... 180/233, 247, 248, 249; 74/711, 710.5, 714; 192/56 F

[56] References Cited

U.S. PATENT DOCUMENTS

| | | | |
|---|---|---|---|
| 2,234,591 | 3/1941 | Fitzner | 74/711 |
| 2,424,942 | 7/1947 | Mynssen | 74/711 |
| 3,869,940 | 3/1975 | Webb et al. | 74/711 |
| 4,373,604 | 2/1983 | Lunn et al. | 180/247 |
| 4,422,349 | 12/1983 | Matsumoto et al. | 180/247 X |
| 4,484,654 | 11/1984 | Hayakawa | 180/247 |
| 4,601,359 | 7/1986 | Weissmann et al. | 180/248 X |
| 4,618,022 | 10/1986 | Hayashi | 180/248 X |

FOREIGN PATENT DOCUMENTS

| | | |
|---|---|---|
| 2209879 | 3/1972 | Fed. Rep. of Germany . |
| 3212495 | 4/1982 | Fed. Rep. of Germany . |
| 1314336 | 2/1962 | France . |
| 2139972 | 5/1983 | United Kingdom . |

Primary Examiner—John J. Love
Assistant Examiner—Charles R. Watts
Attorney, Agent, or Firm—Barnes & Thornburg

[57] ABSTRACT

An all wheel drive for a motor vehicle including a limited slip intermediate differential arranged between the front and rear axles of the vehicle. A plate clutch is included for providing a rotational moment as a function of the rotational speed difference relationship characteristic, to be transferred to the front axle from the rear axle which is different from the rotational moment transferred to the rear axle from the front axle.

3 Claims, 3 Drawing Figures

TRANSMISSION SYSTEM WITH INTERMEDIATE DIFFERENTIAL FOR ALL-WHEEL DRIVE VEHICLE

BACKGROUND AND SUMMARY OF THE INVENTION

The invention generally relates to an all wheel drive for a motor vehicle having a plate clutch, and more particularly, to a plate clutch having different rotational moment transfer characteristic as a function of the rotational speed differences of the axles.

All wheel drive vehicles having an intermediate differential positioned between the front and rear axles have the advantage of avoiding bracing or stressing in the drive train when the vehicle is negotiating a curve or when the individual tires are experiencing different driving conditions. The resulting slippage is accommodated by the differential, thereby improving the driving conditions of the vehicle.

The intermediate differentials, which are typically constructed as planetary gear differentials, should be configured such that during acceleration, the axle load shifting will transfer more driving force to the rear axle than to the front axle. Because the vehicle acceleration along with the motor load and the friction between the tires and the driving surface are controlling and the momentary load conditions of the vehicle also affect the axle load distribution, there is only one fully corresponding acceptable distribution relationship between the driving force at the front and rear axles which is optimal for each operating condition. As a compromise, the distribution relationship of the intermediate differential is designed for an intermediate frictional value for the tires and an intermediate loading condition, with the effect on the driving condition and the load change relationship when driving through curves also being taken into account.

In the all wheel drive described in German Published Unexamined Application (DE-OS) No. 32 12 495 an intermediate differential is provided as a planetary gear transmission which distributes the driving moment between the front axle with respect to the rear axle according to the relationship of 1.25 to 1. Because such an intermediate differential can deliver only a single driving force distribution this arrangement fails to accommodate for a plurality of operating conditions.

In another German Published Unexamined Application (DE-OS) No. 22 09 879, a system attempting to correct these drawbacks is described, in which a fluid friction clutch is arranged in the power flow or power path parallel to the intermediate differential. Such a clutch builds the resulting rotational moment as a function of the rotational speed difference of the clutch parts, for example, with a viscous lamella or plate clutch from the outer plates fixed to a housing with respect to hub fastened inner plates. The rotational moment with respect to the rotational speed difference has a representative characteristic curve which shows a strong degressive characteristic. The rotational moment increases in the region of very small velocity differences at a steep slope. This degressive characteristic, however, is a great disadvantage when negotiating sharp curves with the vehicle. Even if the rotational moment is changed with respect to the rotational speed difference such that the representative characteristic curve is flatter, the viscous lamella or plate clutch could then no longer fully transfer the motor rotational moment to the axle driving on a dry surface from the slipping axle driving on an icy surface, thereby resulting in the viscous lamella or plate clutch becoming overheated and either damaged or destroyed.

Depending on the resultant unequal distribution of the driving force at the rear axle and front axle with the intermediate differential, the slip moments differ depending upon whether the front axle or the rear axle is on a firm road surface.

It is, therefore, an object of the present invention to provide a lamella or plate clutch that can facilitate the driving if one axle is on a slippery road surface and the other axle is on a solid grippable road surface.

The above and other objects are attained by a plate clutch which provides different characteristics depending upon whether the front axle or the rear axle is slipping.

In specially preferred embodiments of the invention, the plate clutch includes a plurality of inner plates and outer plates which alternatively engage between one another. A portion of the plurality of inner plates are rotationally fixed to a driven clutch hub with the remaining plurality of the inner plates being connected to the clutch hub by means of a one way clutch. As a result of this arrangement, the latter portion of inner plates are only engaged in one rotational direction of the clutch hub for transfer of rotational moment.

Certain preferred embodiments of the invention use a plate clutch having mechanical friction connections, other preferred embodiments of the invention utilize a viscous plate clutch which is a plate clutch having rotational moment transfer being effected via fluid friction.

Further objects, features, and advantages of the present invention will become more apparent from the following description when taken with the accompanying drawings which show, for purposes of illustration only, an embodiment in accordance with the present invention.

DETAILED DESCRIPTION OF THE DRAWINGS

Figure 3:
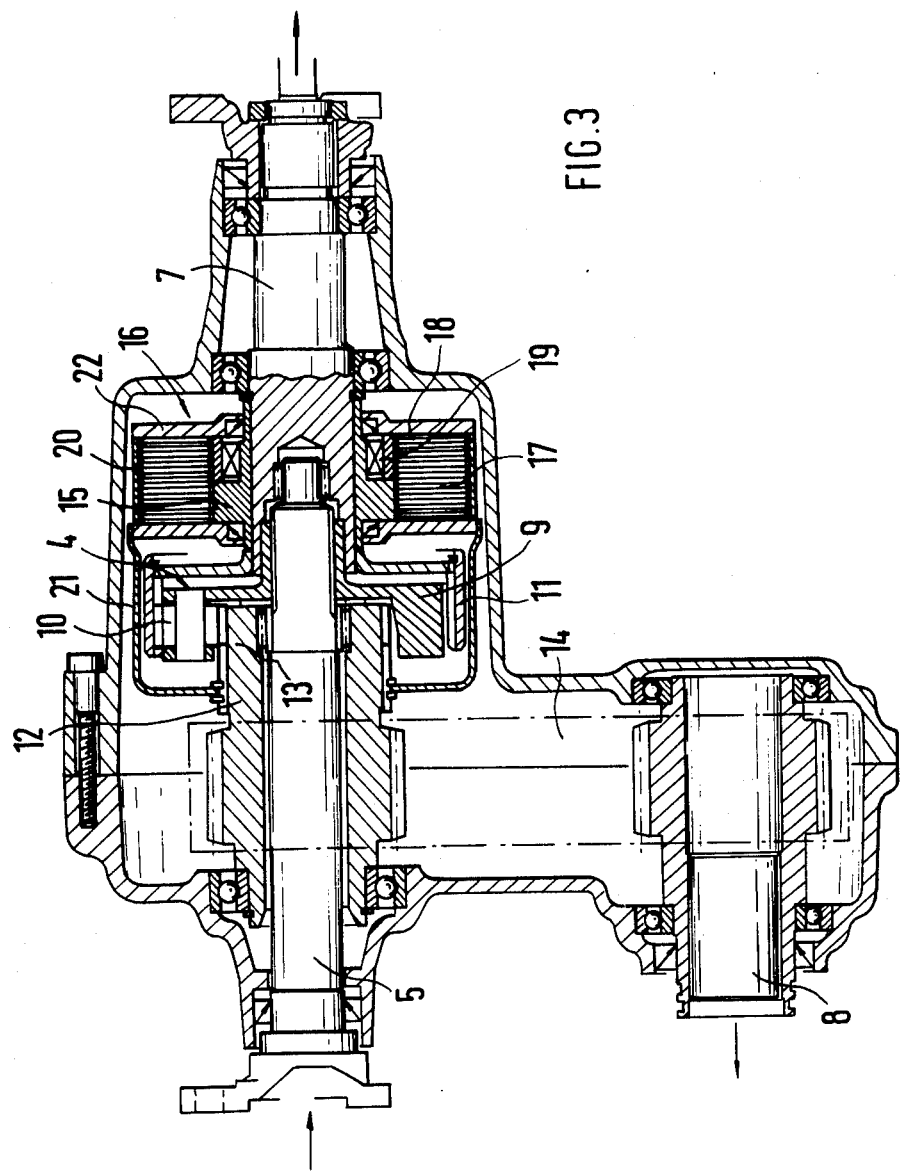
FIG. 3 is an enlarged longitudinal sectional view of the intermediate differential and the viscous plate clutch of the embodiment of FIG. 1.

The front axle 1 and the rear axle 2 of a motor vehicle are permanently or continually driven by a motor 3 via an intermediate differential 4 constructed as a planetary gear transmission. The intermediate differential 4, illustrated in more detail in FIG. 3, is coupled to an inlet shaft 5 originating from the motor 3 and the gear change transmission 6 respectively, to a driven shaft 7 connected to the rear axle 2 and to an additional driven shaft 8 connected to the front axle 1. The hub of a planetary carrier 9 is disposed about a belveled gear of the inlet shaft 5, and coupled to a hollow shaft 11 which is in turn connected to the driving shaft 7 of the rear axle 2 through the hollow shaft 11. The hub 9 also drives a sun gear wheel 13 at a hollow drive shaft which is centrally borne at the inlet shaft 5 and serves to drive a chain drive 14 for driving the front axle 1.

Figure 1:
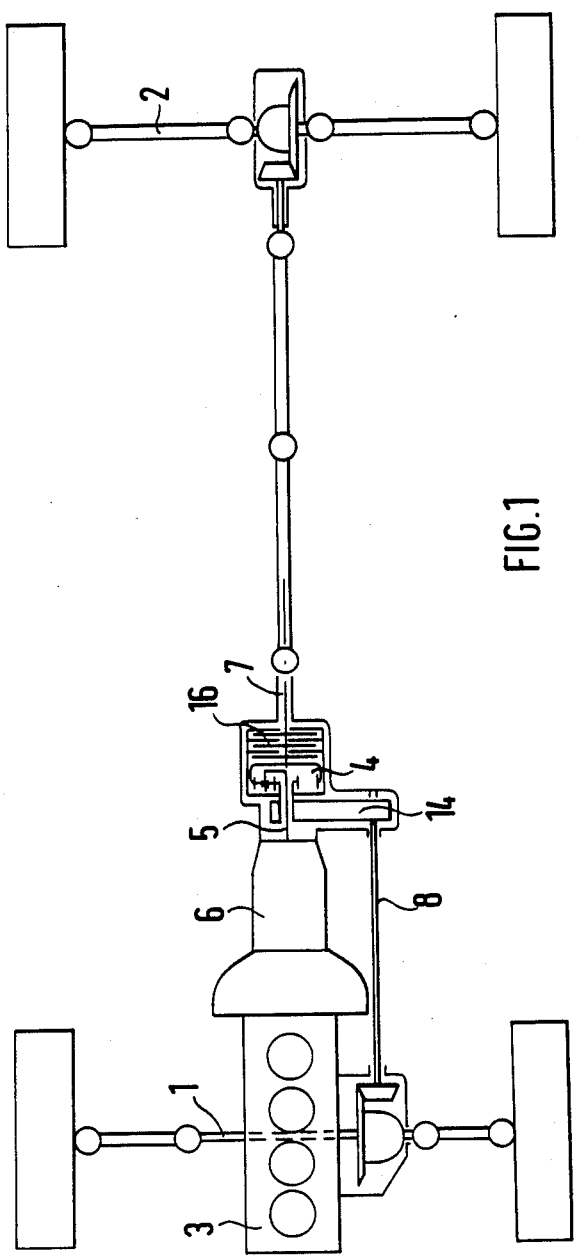
FIG. 1 is a schematic view of an all wheel driven motor vehicle including an intermediate differential and a viscous plate clutch constructed in accordance with a preferred embodiment of the present invention.
Figure 2:
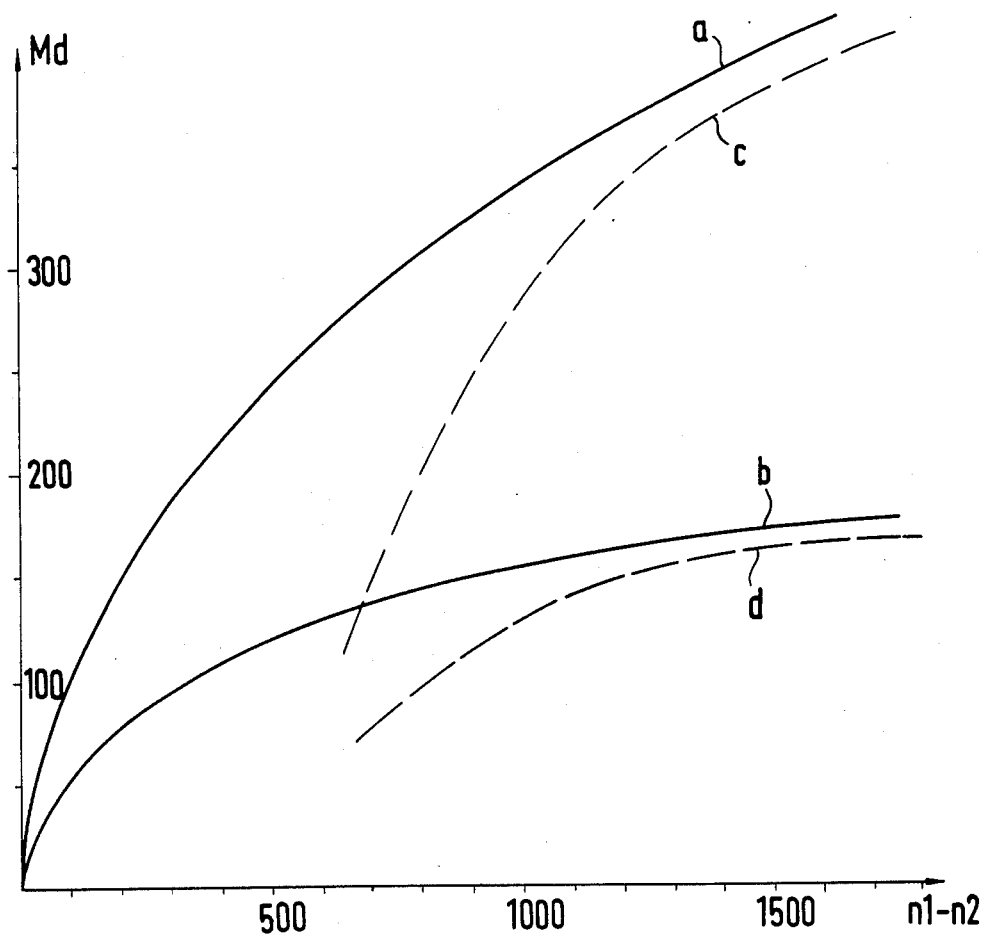
FIG. 2 is a graphical representation of the rotational moment versus axle rotational speed difference characteristics resulting with use of viscous plate clutch constructed in accordance with the embodiment of FIG. 1.

A clutch hub 15 of a viscous plate clutch 16 is fastened at the drive shaft 7 connected to the rear axle 2. A plurality of inner plates 17 are arranged at the outer cover of the clutch hub 15 with a portion of the inner plates 18 being connected with the clutch hub 15 by means of a one way clutch 19. Outer plates 20 interengage between the inner plates 17, 18, with sufficient lateral play. The outer plates 20 are fastened at the inside of a clutch housing 22 which is concentrically located with respect to the clutch hub 15 and has an overlapping bell housing 21 for the planet gear transmission 4. The bell housing 21 is fastened at a wedge-shaped toothed arrangement of the hollow shaft 12. Because the clutch housing 22 is filled with a fluid of high viscosity, the rotational moment Md is transferred through the shear forces of the fluid upon a relative velocity between the inner plates 17, 18 and the outer plates 20, in the manner as depicted in the FIG. 2 illustration showing the degressive curve as a function of increasing rotational speed difference n1–n2 of front axle 1 and rear axle 2.

If the rear axle 2 slips on slippery or smooth road surfaces, both of the inner plates 17 and 18 are effective for transferring the rotational moment from front axle 1 to the rear axle 2 via shaft 8, chain drive 14, hollow shaft 12, bell housing 21, clutch housing 22, outer plates 20, inner plates 17, 18, one way clutch 19, clutch hub 15 and driving shaft 7. This results in the steeply climbing characteristic curve "a". On the other hand, if the front axle 1 slips, then the inner plates 18 are decoupled via the one way clutch 19 so that the rotational moment is transferred from the rear axle 2 to the front axle 1 via driving shaft 7, clutch hub 15, one way clutch 19, inner plates 17, outer plates 20, clutch housing 22, bell housing 21, hollow shaft 12, chain drive 14 and shaft 8. The transferred rotational moment as a result is smaller over the entire rotational speed region and extends according to the flat climbing characteristic curve "b". The characteristic curves "a" and "b" are disposed above the associated curves "c" and "d" respectively for operation of the rotational moment in the first gear via the viscous plate clutch 15 such that the motor rotational moment can be transferred to the road gripping axles, 1 or 2.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. All wheel drive arrangement for a motor vehicle having an intermediate differential arranged between a front and a rear axle, said arrangement comprising:

transfer means for transferring a first range of rotational moments to the front axle from said rear axle as a function of a rotational speed difference between said front and rear axles when said front axle is rotating faster than said rear axle, and transferring a second range of rotational moments different from said first range of rotational moments to the rear axle from said front axle as a function of said rotation speed difference between said front and rear axles when said rear axle is rotating faster than said front axle;

wherein said transfer means include plate clutch means comprising:

clutch housing means;

outer clutch plate means rotationally fixed to said clutch housing means;

clutch hub means rotationally fixedly connected to a driven shaft means; and inner clutch plate means, said inner clutch plate means being drivingly engageable with said driven shaft means by said clutch hub means;

wherein said inner clutch plate means includes a first portion of said inner clutch plate means, wherein said first portion is drivingly engageable with said outer clutch plate means when said front axle is rotating faster than said rear axle, and a second portion of said inner clutch plate means which is drivingly engageable with said outer clutch plate means when said rear axle is rotating faster than said front axle;

further including a one way clutch means disposed between said second portion and said clutch hub means, for decoupling said second portion from said outer clutch plate means when said front axle is rotating faster than said rear axle.

2. The arrangement according to claim 1, wherein said transfer means includes means for causing said transfer of rotational moments in said second range to be greater than rotational moments in said first range.

3. The arrangement according to claim 1, wherein said plate clutch means is a viscous fluid clutch for transferring rotational moment between said inner and outer clutch plate means.

* * * * *